UNITED STATES PATENT OFFICE.

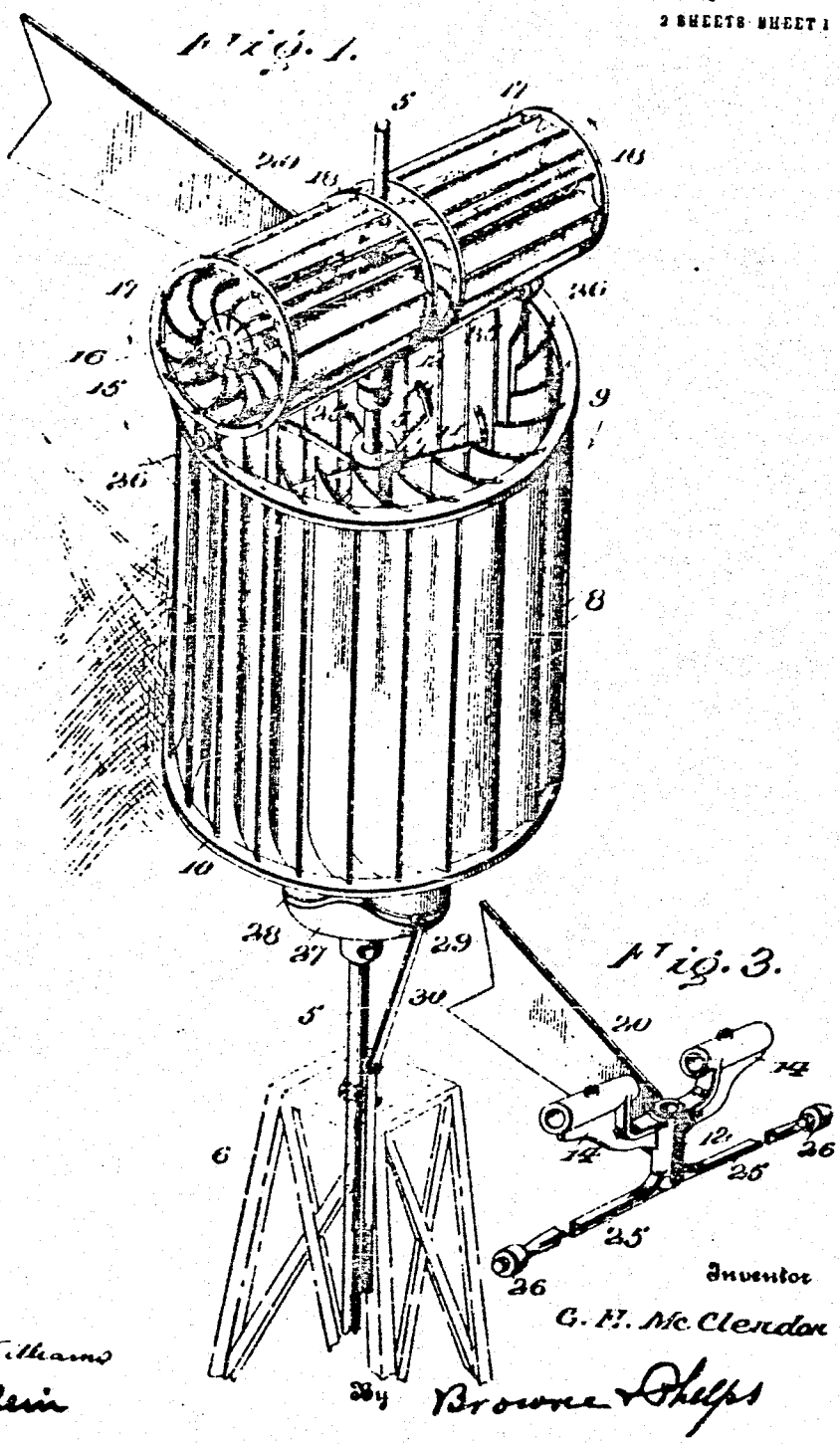

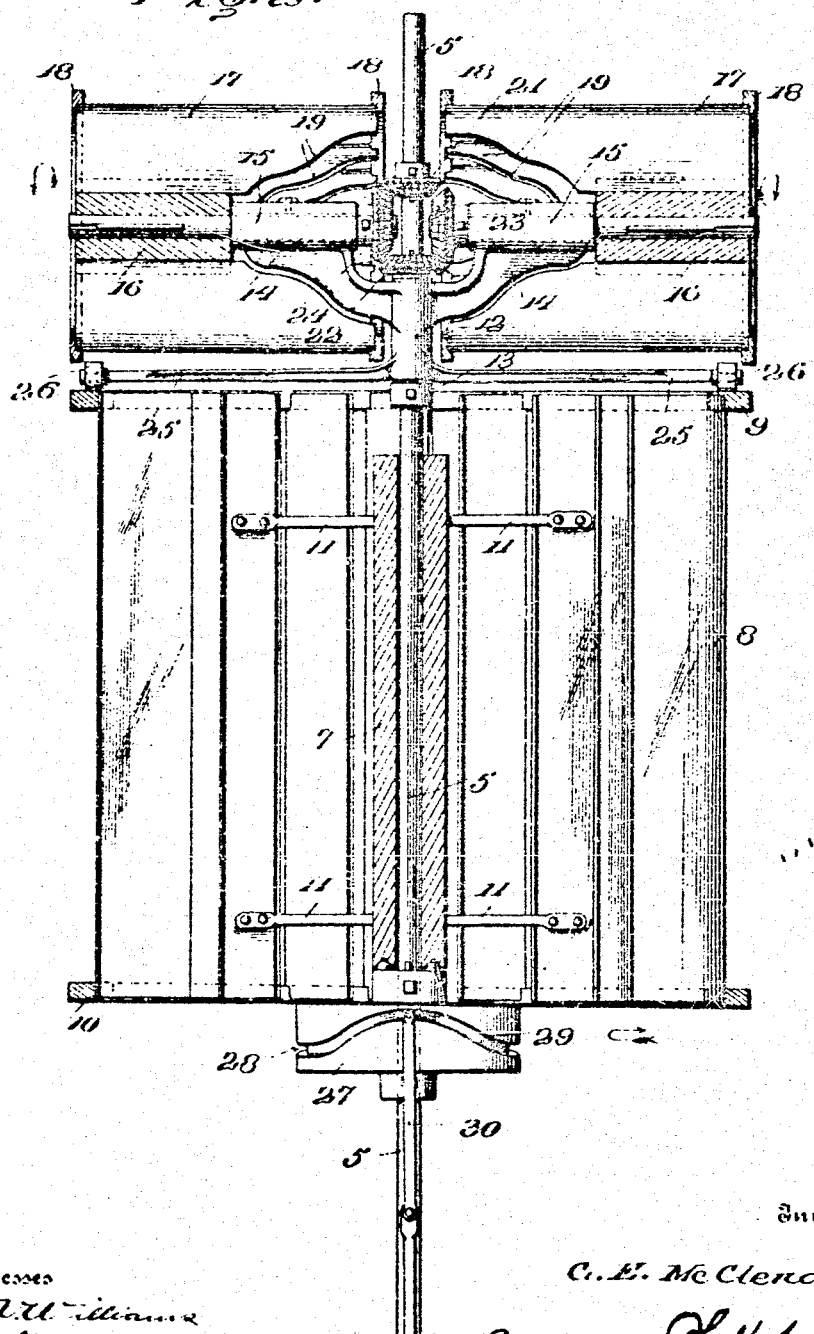

GEORGE E. McCLENDON, OF HERMOSILLO, MEXICO, ASSIGNOR OF ONE-HALF TO GUS-
TAVO ZAMORA AND ONE-FOURTH TO FRANK SMITH, BOTH OF HERMOSILLO, MEXICO.

WIND-WHEEL.

989,381.      Specification of Letters Patent.      Patented Apr. 11, 1911.

Application filed December 10, 1910. Serial No. 596,686.

*To all whom it may concern:*

Be it known that I, GEORGE E. McCLENDON, a citizen of the United States, residing at Hermosillo, State of Sonora, Mexico, have invented certain new and useful Improvements in Wind-Wheels, of which the following is a specification.

My invention relates to certain new and useful improvements in wind-wheels, and the object thereof is to provide a wind-wheel which is simple and compact in construction, composed of few parts, and one which will have a high degree of efficiency.

With these and other objects in view my invention consists in certain constructions, combinations and arrangements of parts, the preferred form of which will be first described in connection with the accompanying drawings and then the invention particularly pointed out in the appended claims.

Referring to the drawings wherein the same part is designated by the same reference numeral wherever it occurs Figure 1 is a perspective view of a wind-wheel constructed in accordance with my invention; Fig. 2 is a central longitudinal section of the construction shown in Fig. 1, and Fig. 3 is a detail perspective view of the parts broken away.

5 designates the vertical shaft suitably supported for rotation in any suitable support, as 6. Fast on this shaft is a hub 7, from which project the vanes 8, the outer ends of the vanes being suitably secured in rings 9 and 10, at their upper and lower ends. The vanes are suitably curved as shown, so that the wheel will be rotated by the wind irrespective of its direction.

11 designates braces for the vanes which are secured to the vanes intermediate the rings 9 and 10 at one end, and to the hub 7 at the other. Rotatably mounted upon the shaft 5, above the hub 7, is a bearing bracket 12 which, at its lower end, is supported by a collar 13 fast on the shaft 5. This bearing bracket is provided with the opposite extending arms 14, in which is journaled a shaft 15, having on its outer end a hub 16 fast on each shaft. Each hub 16 has extending radially therefrom a series of air vanes 17, similar to the vanes 8, the outer edges of the vanes at their ends being secured in spacing rings 18, similar to the spacing rings 9 and 10. The vanes are cut-away as shown at 19, so that they will clear the arms 14 of the supporting bracket 12.

At right angles to the axis of the shaft 15 is a tail 20, by which the wheels mounted on the shafts 15 will be caused to stand with their shafts at right angles to the direction in which the wind is blowing. Fast on the shaft 5, above the bracket 12, are a pair of beveled gears 21, 22, and 23, 24 are a pair of beveled gears, one fast on each shaft 15, the gear 23 being shown as meshing with the gear 22, and the gear 24 meshing with the gear 21, whereby when the horizontal wheels are rotated they will assist in driving the shaft 5. I preferably provide a pair of arms 25 which extend out from the opposite sides of the bracket 12, and carry on their ends rollers 26 adapted to run upon the upper surface of the ring 9 of the vertical wheel, in order to assist in supporting the same.

Power may be taken from the shaft 5 in any suitable way, as for instance by means of the cam wheel 27, having a cam slot 28 therein, and which engages a cam roller 29 of an arm 30, whereby the rotation of the shaft 5 will cause a reciprocation of the arm 30. The arm can be connected to a pump or other mechanism which it is desired to operate by the wind-wheel.

From the foregoing description of my invention it will be evident that the shaft 5 will be directly driven by the wind, causing the vanes 8 of the wheel on the vertical shaft to rotate, and that the said wheel will rotate irrespective of the direction of the wind. Furthermore, the wheels on the horizontal shaft will drive the shaft 5 through the beveled gears, the latter wheels being kept headed into the wind by means of the tail 20.

I realize that considerable variation is possible in the details of construction and arrangement of parts, without departing from the spirit of my invention, and I therefore do not intend to limit myself to the specific form shown and described.

Having thus described my invention what I claim as new and desire to secure by Letters Patent is:

1. The combination with a vertical shaft, of a wind-wheel fast on the shaft, a bracket rotatably mounted on the shaft, a wind wheel rotatably mounted on the bracket, and gearing between the last mentioned wheel and the shaft.

2. The combination with a vertical shaft, of a wind-wheel fast on the shaft, a bracket rotatably mounted on the shaft, a pair of wind-wheels rotatably mounted on the bracket with their axes in line, and gearing connecting the last mentioned wheels to the shaft.

3. The combination with a vertical shaft, of a wind-wheel comprising a hub fast on the shaft, vanes extending radially from the hub, a pair of rings to which the outer edges of the vanes are secured at their upper and lower ends, a bracket rotatably mounted upon the shaft above said wheel, rollers carried by the bracket and running upon said upper ring, a wind-wheel rotatably mounted in the bracket and gearing between the horizontal wheel and the shaft.

In testimony whereof I affix my signature in presence of two witnesses.

GEORGE E. McCLENDON.

Witnesses:
 GEO S. LIVINGSTON,
 K. E. KLEIN.

---

Copies of this patent may be obtained for five cents each, by addressing the "Commissioner of Patents, Washington, D. C."